United States Patent Office 3,663,638
Patented May 16, 1972

3,663,638
AROMATIC HYDROCARBON SEPARATION
BY ADSORPTION
Richard W. Neuzil, Downers Grove, Ill., assignor to
Universal Oil Products Company, Des Plaines, Ill.
No Drawing. Continuation-in-part of application Ser. No.
823,933, May 12, 1969, which is a continuation-in-part
of application Ser. No. 739,176, June 24, 1968. This
application Aug. 31, 1970, Ser. No. 68,568
Int. Cl. C07c 7/12; C10g 25/04
U.S. Cl. 260—674 SA         18 Claims

ABSTRACT OF THE DISCLOSURE

A process for the separation of a $C_8$ aromatic component from a feed mixture containing at least two $C_8$ aromatic hydrocarbons using a crystalline aluminosilicate adsorbent containing barium and potassium cations. A feed mixture is contacted with an adsorbent wherein one component of the feed is preferentially adsorbed by the adsorbent. The preferentially adsorbed component of the feed is thereafter recovered utilizing a desorption step.

CROSS-REFERENCES TO RELATED APPLICATIONS

This application is a continuation-in-part application of co-pending application Ser. No. 823,933, filed on May 12, 1969, now abandoned which is a continuation-in-part of co-pending application Ser. No. 739,176, filed on June 24, 1968, now Pat. No. 3,558,730, all the teachings of said copending applications are incorporated herein by specific reference thereto.

BACKGROUND OF THE INVENTION

Field of the invention

The field of art to which this invention pertains is aromatic separation. More specifically, the invention relates to the separation of $C_8$ aromatic hydrocarbons using a selected crystalline aluminosilicate adsorbent containing barium and potassium cations at exchangeable cationic sites within said zeolite.

Description of the prior art

It is known in the separation art that certain adsorbents generally comprising crystalline aluminosilicates can be utilized to separate certain hydrocarbons from feed mixtures. In aromatic hydrocarbon separation and in particular the separation of $C_8$ aromatic hydrocarbons, it is generally recognized that certain crystalline aluminosilicates containing selected cations at the zeolite cationic exchange sites within the zeolite enhance selectivity of the zeolite for a given $C_8$ aromatic hydrocarbon. Specific reference to relevant art includes the following U.S. Patents which, in particular instances, discloses a separation process which particularly affects the xylene isomer separation by utilizing adsorbents containing certain cations within them. The most relevant art includes Fleck, et al., 3,114,782, Fleck, et al., 3,133,126, and Eberly et al., 3,126,425. The aforementioned patents all relate to general description of a process employing a xylene feed mixture and a crystalline aluminosilicate adsorbent. While the references disclosed generally recognize preferred adsorbents to be either the type X or type Y zeolites, they have not recognized that certain combinations of cations including barium and potassium within a given weight ratio of barium to potassium within the sieve improves selectivity of the zeolite adsorbent for paraxylene. The process of this invention utilizes barium to potassium cations on a zeolite to effect an improved process for para-xylene separation. The barium and potassium cations when placed upon the adsorbent mutually affect each other yielding a synergistic effect.

SUMMARY OF THE INVENTION

It is an object of this invention to provide an improved adsorbent for $C_8$ aromatic isomer separation by employing a type X or type Y structured zeolite which contains barium and potassium cations to improve a desired separation of $C_8$ aromatic hydrocarbons.

It is another object of this invention to improve the separation of para-xylene from a hydrocarbon feed mixture containing at least two different $C_8$ aromatic hydrocarbons by employing an adsorbent comprising a type X or type Y structured zeolite which contains barium and potassium cations in a desired weight ratio to maximize the selectivity of the absorbent for para-xylene over any other $C_8$ aromatic hydrocarbon present in the feed.

The para-xylene isomer is a valuable raw material for the production of terephthalic acid which is used for synthesis of brand name fibers such as "Dacron," "Mylar," and "Terylene." Para-xylene also finds use in the production of vitamins and insecticides.

Mixtures containing substantial quantities of xylene isomers generally are produced by reforming and isomerization processes. In reforming processes, a naphtha feed is reformed at severities selected to produce aromatic compounds which can be separated using the method of this invention. Xylene isomerization processes generally isomerize a xylene mixture deficient in one or more isomers to give an effluent containing increased quantities of the desired xylene isomer which can be separated using the method of this invention.

Present day methods of physical separation of paraxylene generally involve crystallization processes to recover para-xylene in a relatively pure form. Difficulties encountered in separation of para-xylene by crystallization generally involve product purity which requires in some cases a series of crystallization, melting and recrystallization steps to purify a para-xylene product and the incomplete recovery of para-xylene from a feed mixture containing the $C_8$ aromatic hydrocarbons which results in part from the formation of eutectic mixtures.

The process of this invention allows para-xylene isomer to be recovered in a substantially pure, concentration from a mixture containing one or more of the $C_8$ aromatic hydrocarbons by using an adsorbent containing barium and potassium cations which selectively retain para-xylene from a feed mixture.

Adsorption or retention of one or more components of a feed mixture by an adsorbent as defined in this specification includes the physical holding of a component by the adsorbent by the general phenomenon of Van der Waals forces the physical inclusion of a component within the adsorbent because of the physical size or structure of the component or chemisorption of a component on the adsorbent from certain electrostatic forces.

In adsorptive-separation processes, the criterion used to determine the ability of a particular adsorbent to separate components of a feed is the selectivity (B) of the adsorbent for one component as compared to another component. The selectivity (B) used throughout this specification for two given components is defined as the ratio of the two components of an adsorbed or retained phase over the ratio of the same two components in the unadsorbed phase.

Expressed in equation form:

$$\text{Selectivity} = B_{x/y} = \frac{[\text{Vol}\% X / \text{Vol}\% Y]_A}{[\text{Vol}\% X / \text{Vol}\% Y]_U} \quad (1)$$

where X and Y are two components of feed represented in volume percent and the subscripts A and U represent the adsorbed and unadsorbed phases respectively.

As can be seen where the selectivity of two components approaches unity there is no preferential adsorption of one component by the adsorbent. As the $B_{x/y}$ becomes less than or greater than unity, there is a preferential selectivity by the adsorbent of one component. When comparing the selectivity of component X over component Y, $B_{x/y}$ greater than unity indicates preferential adsorption of component X within the adsorbent while a $B_{x/y}$ less than 1.0 would indicate that component Y is preferentially adsorbed leaving an unadsorbed phase richer in component X.

Adsorbents used in the process of this invention include the type X and Y crystalline aluminosilicate zeolites in naturally occurring and synthetically prepared forms which contain barium and potassium cations. Reference can be made to the following United States Patents for the composition and method of manufacture of the type X and type Y crystalline aluminosilicates: U.S. Pats. 2,882,243 and 3,130,007. The methods of manufacturing abovementioned zeolites should not necessarily be limited to the aforementioned patents, but are to be taken as particular examples illustrating in a detailed manner a method by which the adsorbent used in the process of this invention can be produced.

As is known in the art, type X crystalline aluminosilicate zeolite has the following approximate chemical composition of unit crystal cell:

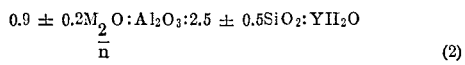

$$0.9 \pm 0.2M_{\frac{2}{n}}O : Al_2O_3 : 2.5 \pm 0.5 SiO_2 : YH_2O \qquad (2)$$

wherein M represents at least one cation having a valence of not more than three, $n$ represents the valence of M and Y may be any value up to about 8, the atoms of the zeolite being arranged in a unit all in an orderly crystalline manner. The type Y zeolite has the same crystal structure as type X but has a different chemical composition. The $SiO_2/Al_2O_3$ ratio for the type Y zeolite is higher than the $SiO_2/Al_2O_3$ ratio for the type X zeolite which results in a corresponding reduction in exchangeable metal cations in the type Y zeolite. The cations present at the exchangeable cationic sites are represented in the above formula by M and are generally selected from the Group I and II metals from the Periodic Table of the Elements.

The term type X or type Y structured zeolites includes those zeolites generally having a crystalline structure substantially similar to the structures disclosed in the patents referring to the type X and type Y zeolites. The type X or type Y structure zeolites generally have cage structures with access to the cavities formed thereby through 12 sided windows having approximate dimensions of from 8–9 angstroms.

The term exchangeable cationic sites is represented by M in Equation 2 above and in order to allow a proper electrovalent balance of the cation present at M with its associated oxygen atom it is required that two +1 charged cations be present or one +2 charged cation be present or ⅔ of a +3 charged cation occupy that site. In determining the total amount of exchangeable cationic sites within a zeolite a procedure described in Example II is used.

The zeolites which can be used in this process can contain binder materials to aid in maintaining adsorbent particle strength. It is not uncommon to observe crystalline aluminosilicates which have up to 25 wt. percent binder. The binders can be clay type materials which hopefully are relatively inert chemically and which do not adversely affect the adsorbent's performance.

Typical adsorbent sizes used commercially are 20–40 mesh particles which appear to be an optimum size to reduce channelling of feed stock through the adsorbent material without presenting unreasonably high pressure drops when flow is taking place. Other size particle diameters may be used however.

In producing a zeolite which contains barium and potassium two alternatives are thought to be possible. The first alternative employs ion exchange methods to place the required cations at the exchangeable cationic sites within the zeolite. The second alternative employs the required metal cations in the actual crystallization step in producing the zeolite.

Cationic exchange methods are generally known to those familiar with the field of crystalline aluminosilicate production and are generally performed by contacting a zeolite with an aqueous solution of soluble salts of the cations desired to be exchanged on the sieves. The desired degree of cation exchange is allowed to take place before the sieves are removed from the aqueous solution and dried to a desired water content of generally less than about 5–10%. The crystalline aluminosilicate zeolites can also be prepared by incorporating in the starting materials in the cations desired at the exchangeable cationic sites within the zeolite.

The percentage of the exchangeable cationic sites in type X and type Y zeolite adsorbents occupied by particular cation or cations is determined by placing the given adsorbent in a calcination furnace at about 500° C. with a nitrogen purge for a period of time long enough to drive off most volatile matter present within the adsorbent. The adsorbent is then chemically analyzed to determine the weight percents of sodium, barium, potassium or any other exchangeable cations present in the adsorbent. By converting the weight percent of a given cation to gram-equivalents per unit weight of adsorbent and summing the total gram-equivalents per unit weight of the adsorbent, it is possible to determine the percentage of exchangeable cationic sites occupied by a given cation or cations.

When employing barium and potassium cations at a substantial portion of the exchangeable cationic sites within the zeolite, it is preferred that at least about 35% of the total cationic equivalents in the zeolite are occupied by barium and potassium cations in order that a reasonably effective separation may be accomplished. Typically the percentage of the exchange of the zeolite will run up as high as 60% and in many instances to percentages approximating 100% displacement of the original cation present in the zeolite when it is desired to remove the originally present cation within the zeolite.

The barium and potassium exchanged type X or type Y structured zeolites can contain varying weight ratios of barium to potassium within the adsorbent. Typically weight ratios of barium to potassium present on the adsorbent can range from less than about 1 up to 100 or even higher and preferably are within the range of from about 1 to about 50. An especially preferred range of the weight ratio of barium to potassium falls within the range of about 5 to about 30 with a range of from 5 to about 17 also being preferred. It can be seen that when employing the substantially cation exchanged zeolite with the preferred ratios of barium to potassium on the zeolite that high content barium zeolites are preferred. The weight ratio of metallic barium to metallic potassium is roughly equivalent to the same ratio of the oxides of these two components. For instance the weight ratio of barium oxide (BaO) as compared to potassium oxide $(K_2O)$ when multiplied by approximately 1.08 yields a direct weight ratio of metallic barium over metallic potassium which ratio is a ratio mentioned throughout this specification and the appended claims.

Feed stocks which can be used in the process of this invention include those streams found in the petroleum or petrochemical fields which contain at least two $C_8$ aromatic hydrocarbons. The $C_8$ aromatic hydrocarbons as used herein include para-xylene, meta-xylene, ortho-xylene and ethylbenzene all of which are relatively difficult to concentrate from each other because of their somewhat similar boiling points. The feed stocks can contain varying concentrations of two or more $C_8$ aromatic hydrocarbons depending on the source of the feed stock whether it be from a reforming zone, isomerization zone or other aromatic production or modification process.

The feeds may contain varying quantities of paraffins, cycloparaffins, aromatics or olefins. In some instances the diluent materials may cause difficulty in achieving a desired separation and are desired to be eliminated from the present process by fractionation or pretreating methods. Typical feed $C_8$ aromatic distributions include 18 vol. percent ethylbenzene, 18 vol. percent para-xylene, 42.1 vol. percent meta-xylene and 21.9 vol. percent ortho-xylene. These distributions can vary depending on the feed source.

In some cases it is preferable to concentrate both para-xylene and ortho-xylene product streams from feed mixtures of the three xylene isomers and ethylbenzene. In this case the ortho-xylene can be separated from the feed mixture by fractionation methods prior to contacting the feed with the faujasite adsorbent to separate the para-xylene component.

In separating the para-xylene isomer in the process of this invention a bed of solid adsorbent is contacted with a feed mixture, the para-xylene is preferentially adsorbed on the adsorbent, the unadsorbed or raffinate mixture is removed from the solid adsorbent. The adsorbent can be contained in a single chamber where, through programmed flow into and out of the chamber, a separation of a para-xylene stream is effected. Swing bed operational technique where a series of adsorbent chambers are available or simulated moving bed counter-current operations similar to the general pattern of operations as disclosed in U.S. Pat. 2,985,589 can be used. In the latter method of operations the selection of a suitable desorbent requires that it be capable of readily displacing adsorbed para-xylene from the adsorbent and also that the para-xylene in the feed mixture be able to displace adsorbed desorbent from a previous desorption step. This requires that a desorbent used in a simulated moving bed process where there is a continuous transfer of para-xylene and desorbent into and out of the adsorbent have a B, when compared to para-xylene, close to unity and preferable slightly less than unity since mass action effects are used to desorb adsorbed para-xylene with the desorbent when collecting para-xylene product and mass action effects are also used to desorb adsorbed desorbent with para-xylene when the para-xylene is being adsorbed on the adsorbent.

Desorbents which can be used in the process of this invention should be materials that are separable from the mixture that is fed to the solid adsorbent. In desorbing the preferentially adsorbed component of the feed both desorbent and the desorbed feed component are removed from the adsorbent bed in admixture, and without a method of separation of these two materials the purity of the selectively adsorbed component of the feed would not be very high. Therefore, it is contemplated that a desorbent that is of a different boiling range than the feed mixture fed to the solid adsorbent be used in this separation process. The use of a desorbent of a differing boiling range would allow fractionation methods to be used to separate the selectively adsorbed feed component as a relatively pure product stream and allow recovery of the desorbent for possible reuse in the process.

Desorbents which can be used in the process of this invention include benzene, toluene, higher aromatics, ethers, alcohols, cyclic dienes and the ketones, all of which should have different boiling points than para-xylene. Benzene, toluene and diethylbenzenes are particularly preferred desorbents for use in the process of this invention.

Both liquid and vapor phase operations can be used in the process of this invention. When using liquid phase operations the temperature requirements are somewhat reduced by the use of superatmospheric pressure. Temperature ranges which can be used in adsorption of the preferred xylene isomer within the adsorbent include the range of from about 10° C. to about 300° C. Pressures preferred in the operation of this invention are included in the range of from about atmospheric to about 600 p.s.i.g.

EXAMPLE I

In testing various adsorbents, in this example, the selectivity as defined previously was determined using a dynamic testing apparatus and procedures as described below. The dynamic testing apparatus used to measure the selectivity of a particular adsorbent consisted of a chamber of approximately 40 cc. volume having inlet and outlet ports at opposite ends of the chamber. The chamber was contained within a temperature controlled heating means and in addition pressure control equipment was used to operate the chamber at a constant predetermined pressure. Standard chromatographic analysis equipment was attached to the outlet line connected to the outlet of the adsorbent chamber.

The following general procedures were used to determine the selectivity for various adsorbents tested in the chamber. A feed mixture having a known composition was passed through the adsorbent chamber at a regulated pressure and temperature until the effluent composition flowing from the adsorbent chamber remained at a constant composition indicating that equilibrium conditions were attained—there being no net transfer of material between the adsorbed phase within the adsorbent and the unadsorbed or external phase surrounding the adsorbent particles. The feed to the adsorbent chamber was then stopped and a second mixture containing a hydrocarbon which was able to desorb the previously adsorbed component of the feed from the adsorbent was then passed through the adsorbent chamber. The chromatographic analysis equipment was used to analyze the unadsorbed or external phase and the material desorbed from within the adsorbent. Knowing the compositions of the adsorbed and unadsorbed streams, the selectivity of a particular adsorbent could then be calculated using the definition previously given for selectivity.

Feed to the adsorbent chamber when measuring the selectivities of the $C_8$ aromatic hydrocarbons contained about 25 liquid volume percent of $C_8$ aromatics and 75 liquid volume percent of iso-octane (2,2,4-trimethylpentane) diluent. The $C_8$ aromatics present in the feed were para-xylene, meta-xylene and ethylbenzene in individual concentrations of about 8⅓ liquid volume percent of the total feed.

From previous experimental work it has been found that ortho-xylene is adsorbed with approximately the same tenacity as meta-xylene and that the selectivity for meta-xylene over another $C_8$ aromatic isomer is generally similar to the selectivity for ortho-xylene over the same isomer. In order to simplify the analysis of the adsorbed phase it was decided to eliminate the ortho-xylene isomer from the feed mixture and to regard the selectivities found for meta-xylene to be indicative of selectivities that would be found for ortho-xylene.

The desorbent material used to desorb the feed from the adsorbent was a mixture of about 25 liquid volume percent toluene in 75 liquid volume percent iso-octane diluent.

The feed and desorbent materials were passed into the adsorbent chamber which was maintained at about 150° C. The selectivities in either liquid or vapor phase measured at the same temperature are about the same, but the vapor phase operations show slightly higher selectivities because of the influence of the difference in relative volatilities of the components tested.

The various adsorbents tested in this example were all type Y structured zeolites having $SiO_2/Al_2O_3$ mole ratios of about 3.3. The zeolites tested were all air equilibrated before they were tested for the selectivities or chemically analyzed. The air equilibration procedure consisted of contacting the zeolites with air in a muffle furnace at a temperature of about 500° C. for a sufficient time to allow the zeolite to reach a constant weight indicating equilibrium between the hot gas and the zeolites.

Six different adsorbents were tested in a manner which showed the advantages of utilizing a zeolite containing both barium and potassium at the exchangeable cationic sites within the zeolite.

EXAMPLE II

In this example type X structured zeolites were tested to show the effects of barium and potassium on these type zeolites.

The description of the six adsorbents tested in this example is shown in Table II below.

TABLE II

| Adsorbent description | Weight percent component [1] | | | Wt. ratio, Ba/K | Total g. equivalent or cationic sites per 100 g. of adsorbent | Percent of total g. equivalent or cationic sites occupied by given component | | |
|---|---|---|---|---|---|---|---|---|
| | K | Ba | Na | | | K | Ba | Na |
| VII | 6.1 | 13.5 | 1.4 | 2.22 | 0.415 | 37.6 | 47.7 | 14.7 |
| VIII | 5.5 | 15.3 | 1.4 | 2.80 | 0.426 | 33.1 | 52.4 | 14.5 |
| IX | 3.5 | 18.6 | 1.3 | 5.30 | 0.428 | 21.0 | 63.6 | 15.4 |
| X | 14.1 | | 1.4 | 0 | 0.423 | 85.1 | | 14.9 |
| XI | | 24.7 | 1.4 | ∞ | 0.427 | | 85.1 | 14.0 |
| XII | | | 18.4 | | 0.420 | | | 100.0 |

[1] Adsorbents contained small portions of binder material.

Adsorbent I was essentially a sodium form zeolite which contained essentially sodium at the cationic exchangeable sites within the zeolite. Adsorbent II was essentially a 100% calcium exchanged zeolite. Adsorbent III was a barium exchanged form of adsorbent I and contained, on an equilibrated basis, about 18.7 wt. percent barium and about 1.9 wt. percent residual sodium. Adsorbent IV was a potassium exchanged form of adsorbent I and contained about 18.0 wt. percent potassium with essentially no residual sodium all measured on an air equilibrated basis. Adsorbents V and VI were barium and potassium exchanged forms of adsorbent I and contained about 12.0 wt. percent barium, 4.7 wt. percent potassium and 0.6 wt. percent sodium and 10.0 wt. percent barium, 4.3 wt. percent potassium and 1.4 wt. percent sodium respectively on an air equilibrated basis. The slight difference in cation composition for adsorbents V and VI was thought to be the result of slight differences in the ion exchange techniques used in preparing the adsorbents.

Using the testing procedures described above, the selectivities of the adsorbents were determined and are shown in Table I below.

TABLE I.—ABSORBENT SELECTIVITIES

| Adsorbent | Description | Selectivity (B) | |
|---|---|---|---|
| | | $B_{p/m}$ [1] | $B_{p/EB}$ [2] |
| I | Na form | 0.75 | 1.32 |
| II | Ca form | 0.35 | 1.17 |
| III | Ba form | 1.27 | 1.85 |
| IV | K form | 1.83 | 1.16 |
| V | Ba plus K form | 3.35 | 2.32 |
| VI | do | 3.76 | 2.10 |

[1] $B_p/m$ = Selectivity of para-xylene with respect to meta-xylene.
[2] $B_p/EB$ = Selectivity of para-xylene with respect to ethylbenzene.

Adsorbent V was also tested for the selectivity of para-xylene with respect to ortho-xylene by replacing the meta-xylene in the feed with ortho-xylene. The results of this test confirmed the similar behavior expected between meta-xylene and ortho-xylene. The selectivity of adsorbent V for para-xylene with respect to ortho-xylene ($B_{p/o}$) was about 3.11.

As can be seen from the above data, the zeolites exchanged with both barium and potassium were superior to any of the other zeolites tested including the barium exchanged and potassium exchanged zeolites. The barium and potassium when placed together on a zeolite mutually affect each other giving a synergistic effect which results in unexpectedly improved selectivities for paraxylene.

While the adsorbents tested in this example were all type Y structured zeolites, it is expected that the same synergistic will occur for the type X structured zeolites containing both barium and potassium within the exchangeable cationic sites within the zeolite.

The six adsorbents shown in Table II above were all type X structured zeolites, five of which had been ion-exchanged in order to replace the sodium originally present at the exchangeable cationic sites within the zeolite. The degree of ion-exchange of the individual zeolites was determined by calculating the percentage of the exchangeable cationic sites (g. equivalents) of the total g. equivalents that were occupied by barium and potassium cations. For example, in adsorbent VII barium and potassium were present at about 85.3% of the total exchangeable cationic sites within the adsorbent.

Sieves VII through XII were each tested in the aforementioned dynamic testing apparatus using the prescribed testing methods of operation. The dynamic testing apparatus was maintained at about 40 p.s.i.g. pressure and about 125° C. temperature while adsorption and desorption operations were being effected. The individual adsorbents were tested until repeatable selectivities were obtained for both para-xylene and meta-xylene, and para-xylene and ethylbenzene. The selectivities are reported below in Table III.

TABLE III

| Adsorbent description | Weight ratio, barium/potassium | Selectivities | |
|---|---|---|---|
| | | $B_{p/m}$ | $B_{p/EB}$ |
| VII | 2.22 | 3.4 | 2.1 |
| VIII | 2.80 | 3.3 | 2.1 |
| IX | 5.30 | 3.5 | 2.3 |
| X | 0 | 1.8 | 1.2 |
| XI | ∞ | 1.3 | 1.8 |
| XII | | 0.8 | 1.3 |

Adsorbent XII of Table III is a sodium form type X zeolite and as seen by its selectivities for para-xylene as compared to meta-xylene and ethylbenzene that this adsorbent is only slightly selective for para-xylene as compared to ethylbenzene ($B_{p/EB}=1.3$) and is not at all selective for para-xylene as compared to meta-xylene $$(B_{p/m}=0.8)$$

Adsorbent XII was essentially totally exchanged with barium cations and tested as adsorbent XI. The presence of barium improved both the $B_{p/m}$ and $B_{p/EB}$ for adsorbent XI as compared to the selectivities determined for adsorbent XII. Adsorbent X which was essentially a totally potassium exchanged type X zeolite showed an improvement only in the para-xylene/meta-xylene selectivity as compared to the sodium form zeolite.

Adsorbent VII, VIII and IX, however, showed an improvement in all respects when compared to any of the adsorbent X, XI and XIII. The presence of both barium and potassium on a zeolite resulted in a synergistic effect on the selectivity of para-xylene as compared to both meta-xylene and ethylbenzene.

In Table IV following three adsorbents were tested which were exchanged with barium and potassium to yield various weight ratios of Ba/K. The sieves were approximately 85% ion-exchanged (about 15% of the cationic sites contained sodium cations) and differed from adsorbents VII through XII above in that they were dried at 300° C. with a nitrogen purge while adsorbents VII through XII were dried at 200° C. with a nitrogen purge.

TABLE IV

| Adsorbent description | Weight ratio, barium/ potassium | Selectivities | |
|---|---|---|---|
| | | $B_{p/m}$ | $B_{p/EB}$ |
| XIII | 0.84 | 1.9 | 1.3 |
| XIV | 1.32 | 2.4 | 1.5 |
| XV | 2.22 | 3.0 | 2.0 |

As can be seen from the data presented in Table IV that as the weight ratio of Ba/K increases for adsorbents XIII, XIV and XV the selectivities for para-xylene as compared to meta-xylene and ethylbenzene also increase. The difference in the selectivities found for adsorbents VII and XV which have identical weight ratios of Ba/K (2.22) is thought to primarily be the result of differences in drying temperatures of the adsorbents (200° C. versus 300° C.).

EXAMPLE III

In this example, various type X structured zeolitic adsorbents were utilized to show the operability of the various type X structured zeolites containing varying weight ratios of barium over potassium for enhanced operations for the selectivity of para-xylene with respect to the other $C_8$ aromatic hydrocarbons.

The various adsorbents were ion-exchanged using barium and potassium aqueous solutions which allowed the varying weight ratios of barium to potassium to be placed upon the zeolite. The chemical analysis of each of the four adsorbents tested shown in Table V below.

TABLE V.—ADSORBENT ANALYSIS

| Adsorbent | XVI | XVII | XVIII | XIX |
|---|---|---|---|---|
| Component [1], wt. percent: | | | | |
| $K_2O$ | 5.6 | 1.7 | 1.5 | 0.9 |
| BaO | 21.1 | 26.7 | 28.2 | 27.7 |
| $Na_2O$ | 0.9 | 1.3 | 1.7 | 2.0 |
| $Al_2O_3$ | 30.5 | 28.9 | 28.1 | 28.4 |
| $SiO_2$ | 40.1 | 39.7 | 39.1 | 40.3 |
| Ba/K, wt. percent/wt. percent | 4.1 | 17.0 | 20.1 | 33.3 |

[1] Adsorbent compositions given are based on volatile free basis after subjecting adsorbents to an inert purge at 500° C. until constant weight was achieved.

In this example a feed stock was utilized which contained approximately 5 vol. percent each of para-xylene, meta-xylene, ortho-xylene, and ethylbenzene along with 5 vol. percent normal nonane which was used as a tracer component when analyzing the effluent stream from the adsorbent chamber used herein together with 67.5 vol. percent Decalin and 7.5% para-diethylbenzene which were used as diluent material. The desorbent material which was used in this example comprised a mixture of 90 vol. percent Decalin and 10 vol. percent para-diethylbenzene.

The equipment used for testing the adsorbents in this example was essentially an adsorbent chamber containing approximately 70 cc. of a selected adsorbent and contained in a six-foot three-eighth inch outside diameter copper column. The copper column was contained within the heat control means in order to maintain essentially iso-thermal operations throughout the adsorption column. The column was maintained at temperature of approximately 150° C. with feed and desorbent streams preheated in order to maintain isothermal operation throughout the system. Gas chromatographic analysis equipment was attached to the effluent stream leaving the adsorbent chamber in order to determine the composition of the effluent stream at given time intervals. Knowing the feed rate into and out of the adsorbent chamber, the temperature, the feed and desorbent composition, and the particular chromatograph pattern shown by the effluent materials leaving the column, it was possible to determine concentrations of the components in the adsorbed and unadsorbed phases. Knowing this data the selectivity as defined in Equation 1 above was determined for any of the two given feed components.

The operations taking place were as follows. The desorbent was run continuously at a normal 1 liquid hourly space velocity (LHSV) which amounted to about 1.17 cc. per minute feed rate of desorbent. During some convenient time interval the desorbent was stopped. The feed is then run from a ten minute interval at 1 LHSV flow rate. The desorbent stream is then resumed at 1 LHSV and continues to pass into the adsorption column until all of the feed $C_8$ aromatics have been eluted from the column by observing the chromatograph generated by the effluent material leaving the adsorption column. The sequence of operations usually takes about an hour. The ten minute pulses of feed and subsequent desorbent may be repeated in sequences as often as is desired to achieve repetitive chromatographs and substantiate the readings for each of them.

To evaluate the performance of the adsorbents, the distance, in cc., of desorbent pumped between the mid-point of the normal nonane tracer peak envelope and the mid-point of the $C_8$ aromatic peak envelope was measured. The selectivity for para-xylene with respect to the other $C_8$ aromatics is considered to be the ratio of distance between the center of the para-xylene peak envelope and the $C_9$ tracer peak envelope to the corresponding distances for ethylbenzene, meta-xylene and ortho-xylene. The test data for the various adsorbents tested is shown in Table VI below.

TABLE VI.—SELECTIVITY DATA

| Adsorbent | Weight ratio, Ba/K | Selectivities | | |
|---|---|---|---|---|
| | | $B_{p/EB}$ | $B_{p/m}$ | $B_{p/o}$ |
| XVI | 4.1 | 1.9 | 4.4 | 4.2 |
| XVII | 17.0 | 2.2 | 4.6 | 5.1 |
| XVIII | 20.1 | 2.2 | 3.5 | 3.7 |
| XIX | 33.3 | 2.2 | 3.1 | 3.0 |

The above data indicates that varying barium over potassium weight ratios of zeolitic adsorbent can effect the selectivities of an adsorbent for para-xylene with respect to the various $C_8$ aromatic hydrocarbons.

The examples given above are specific embodiments of the process of the claimed invention and are not presented to unduly limit the scope of the appended.

EMBODIMENT

An embodiment of this invention resides in an improved process for the separation of para-xylene from a hydrocarbon feed mixture comprising at least two $C_8$ aromatic hydrocarbons wherein said feed mixture is contacted, at adsorption conditions, with a crystalline aluminosilicate adsorbent selected from the group consisting of type X and type Y structured zeolites containing barium and potassium cations to effect the selective retention of a major portion of said para-xylene by said adsorbent, with drawing from the adsorbent less selectively retained components of said feed and thereafter removing said selectively retained para-xylene from said adsorbent, wherein said improvement comprises employing a zeolite adsorbent having a weight ratio of barium cations over potassium cations within the range of from about 0.5:1 to about 100.

I claim as my invention:

1. A process for separating a specific xylene isomer from a mixture containing said isomer and at least one other $C_8$ aromatic hydrocarbon which process comprises contacting said mixture with a crystalline aluminosilicate adsorbent having pore diameters of from about 7 to about 17 angstroms and containing barium and potassium at exchangeable cationic sites within the adsorbent crystalline structure in a weight ratio of barium to potassium of from about 1 to about 100 at adsorption conditions to effect the selective adsorption of said xylene isomer by said adsorbent and recovering from said adsorbent a stream concentrated in said xylene isomer.

2. Claim 1 further characterized in that said adsorbent selected from the group consisting of type X and type Y structured crystalline aluminosilicates.

3. Claim 2 further characterized in that para-xylene is the specific xylene isomer.

4. Claim 3 further characterized in that said adsorption conditions include a temperature within the range of from about 10° C. to about 250° C. and a pressure with the range of from about atmospheric to about 600 p.s.i.g.

5. In a process for the separation of para-xylene from a hydrocarbon feed mixture comprising at least two $C_8$ aromatic hydrocarbons including the steps of: contacting said feed mixture at adsorption conditions with a crystalline aluminosilicate adsorbent to effect the selective retention of a major portion of said para-xylene by said adsorbent; withdrawing from the adsorbent less selectively retained components of said feed; and, thereafter removing said selectively retained para-xylene from said adsorbent; the improvement which comprises employing as said adsorbent a type X or type Y structured crystalline aluminosilicate containing barium and potassium cations at the exchangeable cationic sites within the crystalline structure in which the weight ratio of barium cations to potassium cations is within the range of from about 1 to about 50.

6. Claim 5 further characterized in that above about 75% of the exchangeable cationic sites within said zeolite are occupied by a cation selected from the group consisting of barium and potassium cations.

7. Claim 6 further characterized in that said weight ratio of barim cations to potassium cations is within the range of from about 5 to about 35.

8. Claim 7 further characterized in that said weight ratio of barium cations to potassium cations is within the range of from about 5 to about 17.

9. In a process from the separation of at least one $C_8$ aromatic hydrocarbon from a hydrocarbon feed mixture comprising at least two $C_8$ aromatic hydrocarbons which process comprises the steps of:
   (a) contacting said feed mixture at adsorption conditions with an adsorbent comprising a crystalline aluminosilicate zeolite to effect the selective retention by said adsorbent of a major portion of one said $C_8$ aromatic hydrocarbons;
   (b) withdrawing from said bed of adsorbent a raffinate stream comprising at least one $C_8$ aromatic hydrocarbon which is relatively less selectively retained by said adsorbent;
   (c) contacting said adsorbent with a desorbent material at desorption conditions to effect the removal of the selectively retained $C_8$ aromatic hydrocarbon of the feed from the adsorbent; and,
   (d) withdrawing from the adsorbent a stream comprising adsorbent material and a selectivity retained $C_8$ aromatic portion of said feed mixture;
the improvement which comprises employing as said adsorbent a type X or type Y structured crystalline aluminosilicate containing barium and potassium cations in a weight ratio of barium cations to potassium cations within the range of from about 1 to about 100.

10. Claim 9 further characterized in that said hydrocarbon feed contains para-xylene and at least one $C_8$ aromatic hydrocarbon selected from the group consisting of ortho-xylene, meta-xylene and ethylbenzene and para-xylene is selectively retained by said adsorbent.

11. Claim 10 further characterized in that above about 75% of the exchangeable cationic sites with said zeolite are occupied by a cation selected from the group consisting of barium and potassium cations.

12. Claim 11 further characterized in that said weight ratio of barium cations to potassium cations is within the range of about 1 to about 50.

13. Claim 12 further characterized in that said weight ratio is within the range of from about 5 to about 35.

14. Claim 13 further characterized in that said weight ratio is within the range of from about 5 to about 17.

15. In a process for the separation of para-xylene from a hydrocarbon feed mixture comprising at least one other $C_8$ aromatic hydrocarbon which process comprises the steps of:
   (a) contacting said feed mixture with an adsorbent comprising a crystalline aluminosilicate at adsorption conditions to effect the retention by said adsorbent of a portion of the para-xylene in said feed mixture;
   (b) withdrawing from said adsorbent a stream comprising at least one $C_8$ aromatic hydrocarbon which is relatively less selectively retained by said adsorbent than said para-xylene;
   (c) contacting the adsorbent with a desorbent material at desorption conditions to effect the removal of para-xylene from the adsorbent; and,
   (d) withdrawing from said adsorbent a stream comprising desorbent material and para-xylene; the improvement which comprises employing as said adsorbent a type X or type Y structured crystalline aluminosilicate containing barium and potassium cations in which the weight ratio of the barium cations to potassium cations is within the range of from about 5 to about 35.

16. Claim 15 further characterized in that the weight ratio of barium cations to potassium cations is within the range of from about 5 to about 17.

17. Claim 16 further characterized in that said adsorbent comprises a type X structured zeolite.

18. Claim 16 further characterized in that said adsorbent comprises a type Y structured zeolite.

References Cited

UNITED STATES PATENTS

| | | | |
|---|---|---|---|
| 3,114,782 | 12/1963 | Fleck et al. | 260—674 |
| 3,126,425 | 3/1964 | Eberly et al. | 260—674 |
| 3,133,126 | 5/1964 | Fleck et al. | 260—674 |
| 3,558,730 | 1/1971 | Neuzil | 260—674 |

DELBERT E. GANTZ, Primary Examiner

C. E. SPRESSER, JR., Assistant Examiner

U.S. Cl. X.R.

208—310